Patented Apr. 20, 1937

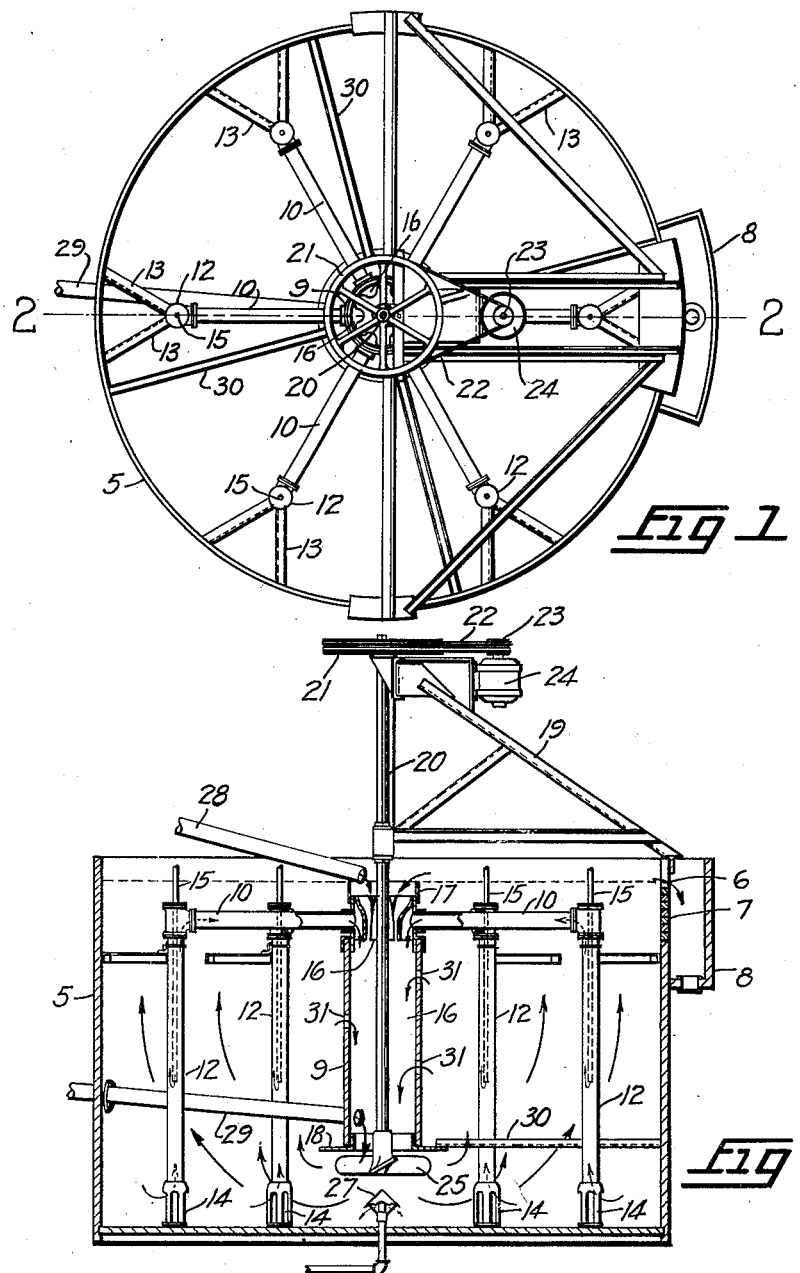

2,077,445

UNITED STATES PATENT OFFICE 2,077,445

AERATOR OR AGITATOR

Harry V. Wallace, Kirkland Lake, Ontario, Canada, and Leland H. Logue, Denver, Colo., assignors to Denver Equipment Company, Denver, Colo.

Application November 8, 1932, Serial No. 641,748

17 Claims. (Cl. 261—93)

This invention relates to an aerator or agitator for use in the treatment of materials requiring thorough mixing or agitation in various processes.

The invention is particularly adapted for use in processes of recovering values from finely pulverized or ground ores or concentrates where solids and liquids must be kept in intimate contact and in motion with respect to each other during any desired period of aeration, agitation or processing, thus assisting and materially hastening the dissolution of values contained in said earthy materials or finely ground ore by chemical means requiring aeration and oxidation, especially in cyanidation operations.

The invention may also be used with equally good results, in processes of chemical leaching or dissolving solids in liquids.

It is an object of the invention to provide a mechanism of simple construction by which the process of mixing and agitating materials in liquids may be performed through the instrumentality of a plurality of air lifts, and other objects reside in providing certain novel and useful improvements in apparatus of the type shown and described in the patent of Arthur C. Daman, No. 1,921,220, issued Aug. 8, 1933.

An embodiment of the invention has been shown in the accompanying drawing in the several views of which like parts are similarly designated, and in which Figure 1 is a plan view of the improved conditioner or agitator, and Figure 2, a section taken on the line 2—2, Figure 1.

The agitator or aerator comprises a cylindrical tank 5 having an overflow 6 above a weir 7, composed of separately removable sections so that the level of the overflow may be varied. Material overflowing the weir passes into a peripheral launder 8.

Suspended in the tank is a system of devices adapted to effect a vertical circulatory movement of matter in the tank, whereby it is readily and thoroughly mixed, or aerated or agitated as the case may be.

The system comprises an open-ended conduit 9 connected adjacent its upper end by means of radiating pipes 10 with a concentric series of vertical tubes 12, which, by means of diverging spider arm-brackets 13, are connected with the circumferential wall of the tank; the open end of the conduit may be placed in the center of the tank or at any other point thereof.

Each of the tubes constitutes an air lift, having at its lower end, adjacent the bottom of the tank, a number of inlets 14. Into the upper end of each tube extends a small pipe 15 connected with a conveniently located source of air under pressure greater than the hydrostatic pressure of the liquid in the tank. It will be observed that the liquid level, determined by the overflow 6, is above the pipes 10, and there is always sufficient hydrostatic head in the tank to force liquid upwardly through the pipes 12, the introduction of air through pipes 15 serving to augment the pressure of this hydrostatic head and thereby effect a more rapid circulation and aeration. Inside the conduit 9 is a series of baffles 16 extending over the openings of the radiating pipes 10 connecting with the air lifts 12.

At the upper end of the conduit is a sliding collar 17, which is adjustable to vary the level of the mouth of the conduit. At the lower end of the conduit, is an outwardly extending flange 18. The column 9 has, furthermore, a number of openings 31 at different elevations for the recirculation of material in the tank.

Rotatably supported on a superstructure 19 is a shaft 20 which extends in the axis of the conduit. At the upper end of the shaft is a pulley 21, which, by means of a belt 22, is connected with a driving pulley 23 on the shaft of a motor 24 likewise supported on the superstructure.

At the lower end of the shaft, immediately beneath the flanged lower end of the conduit, is an impeller 25 which in the operation of the device, draws the material downwardly through the conduit. Below the impeller in axial alinement therewith, is an air pipe 26, the end of which is protected against the entrance of material, by a hood 27.

The material to be treated may be fed into the conduit at the upper end thereof, as through a pipe or launder 28, or adjacent to or at the lower end thereof, as through a pipe or launder 29; or the material may be fed directly into the tank at any part thereof, the main point being the desirability of letting the pulp inflow down the central conduit by centripetal force all around the periphery of the conduit, so that as much air as possible is entrained as the pulp enters the conduit.

The hoods 16 over the openings of the pipes 10 will cause the air-lifted liquid to spray in the shape of a fishtail and will further allow the inflowing liquid, which inflows by centripetal force, to entrain air and carry it down the inside of the wall of the conduit, and between each hood.

In order to further insure the stability of the circulation system, the flange at the lower end of the conduit 9 may be connected to the circumferential wall of the tank by braces 30.

In the operation of the conditioner, material is drawn through the conduit by the rotary impeller which also causes it to move subsequently upwardly in the tank exteriorly of the conduit. Part of the upwardly moving matter is returned into the conduit over the collar 17 and through the inlet opening 31 in a circulatory movement, while other parts of the material are drawn into the lower ends of the tubes 12 and through the tubes and the pipe 10 into the upper end of the conduit, by the air lifts and the hydrostatic head.

Froth accummulating at the surface of liquid in the tank is returned to the conduit across the edge of the collar 17, which performs the function of an adjustable weir, and the finished material is discharged from the tank across the overflow 6, into the launder 8. The return flow of the froth to the conduit is an important feature of the operation.

It will be apparent from the above description that the material fed into the conduit through either or both of the pipes or launders 28 and 29, moves continuously and upwardly outside the same by action of the impeller, and further moves in circulatory currents, through the conduit by means of the tubes 12 and/or the inlets 31 of the conduit. Consequently, the material is constantly maintained in an agitated condition by a continual circulatory movement, through the combined actions of the impeller, the air lifts and the hydrostatic head. The air entering the material through the pipes 15 and/or the pipe 26, also aerates the material in the tank and thereby aids the aeration and agitative action.

The flange 18 at the lower end of the conduit prevents sanding in an upward direction by influence of the impeller, and directs the currents of circulating matter outwardly from the conduit. The adjustable collar 17 regulates the return of froth and other supernatant matter to the conduit, and the multiplicity of air lifts distributed throughout the tank around the central conduit, eliminates the formation of so-called "dead pockets" and insures a constant and uniform movement of the material throughout the greater area of the tank.

The hoods 16 inside the conduit not only separate the circulating matter from the fresh feed, but cause a spraying action and also prevent spitting of the circulating streams as they are discharged into the conduit from the air lifts 12, through the pipes 10 and thus confine the air for useful contact with the solution instead of being dissipated or wasted.

Under certain conditions, the required circulatory mixing action may be obtained by the air lifts individually without connection with the central conduit, but for most materials, the connections between the air lifts and the central conduit by the pipes, are desirable.

What we claim and desire to secure by Letters Patent is:

1. An agitator or conditioner comprising a tank open to the atmosphere, a central conduit in the tank, a rotary impeller below the conduit, and an air lift in the tank, having an inlet opening at its lower end, and connecting with the conduit at its upper end.

2. An agitator or conditioner comprising a tank open to the atmosphere, a conduit in the tank, a rotary impeller below the conduit, a downwardly ranging tube, in the tank, having an inlet opening at its lower end, and connecting with the conduit at its upper end, and a pipe for the introduction of air into the tube.

3. An agitator or conditioner comprising a tank, a conduit in the tank, a rotary impeller below the conduit, an air-lift in the tank, outside the conduit, having an inlet at its lower end and having an outlet connecting with the conduit, and a hood inside the conduit over the outlet.

4. An agitator or conditioner comprising a tank, a conduit in the tank, a rotary impeller below the conduit, and an air-lift in the tank, outside the conduit, having an inlet at its lower end and having an outlet connecting with the conduit, the conduit having also an opening for the intake of material directly from the tank.

5. A conditioner or agitator comprising a tank open to the atmosphere, a conduit in the tank, means to draw material through the conduit to the lower portion of the tank, downwardly ranging tubes arranged around the conduit, having inlets in said lower portion of the tank, and outlets at their upper ends, pipes connecting the outlets with the conduit, and means for introducing air into the tubes.

6. A conditioner or agitator comprising a tank, a conduit in the tank, means to draw material through the conduit into the lower portion of the tank, downwardly ranging tubes arranged around the conduit, having inlets in said lower portion of the tank and outlets at their upper ends, pipes connecting the outlets with said space inside the conduit, and hoods inside the conduit, over the outlets of the pipes.

7. An agitator or aerator comprising a tank having an overflow determining a liquid level in the tank, a conduit in the tank, a rotary impeller below the conduit, and a downwardly-ranging tube in the tank having an inlet opening at its lower end and connecting with the conduit at its upper end, below the liquid level in the tank.

8. An agitator or aerator comprising a tank having an overflow determining a liquid level in the tank, a conduit in the tank, a rotary impeller below the conduit, and a downwardly-ranging tube in the tank having an inlet opening at its lower end and connecting with the conduit at its upper end, below the liquid level in the tank, the conduit being apertured between said connection and the impeller for the recirculation of material in the tank.

9. An agitator or aerator comprising a tank having an overflow determining a liquid level therein, a conduit in the tank having its upper end at the liquid level, a rotary impeller below the lower end of the conduit, a downwardly-ranging tube in the tank having an inlet opening at its lower end and connecting with the conduit at its upper end, below the liquid level in the tank, and means for admitting air under pressure into material discharging from the conduit.

10. An agitator or aerator comprising a tank having an overflow determining a liquid level therein, a conduit in the tank having its upper end at the liquid level, a downwardly ranging tube in the tank having an inlet opening at its lower end and connecting with the conduit at its upper end, below the liquid level in the tank, and means for producing an upward flow of liquid in the tube and a simultaneous downward movement thereof in the conduit.

11. An agitator or aerator comprising a tank having an overflow determining a liquid level therein, a conduit in the tank having its upper end at the liquid level, a downwardly ranging tube in the tank having an inlet opening at its lower end and connecting with the conduit at its upper end, below the liquid level in the tank, means for producing an upward flow of liquid in the tube and a simultaneous downward movement thereof in the conduit, and means for admitting air under pressure into material discharging from the conduit.

12. An agitator or aerator comprising a tank having an overflow determining a liquid level therein, an open-ended conduit having its upper end at the liquid level, a rotary impeller below the lower end of the conduit, and means for admitting air under pressure into material discharging from the conduit.

13. A conditioner or agitator comprising in combination, a tank having an overflow weir determining the liquid level therein, a conduit in the tank, open at the liquid level to permit the free overflow of supernatant matter of material thereinto, an impeller located below the conduit to draw material downwardly through the same, a downwardly ranging tube in the tank, having an inlet at its lower end and having its upper end connected with the conduit near its upper end and below the liquid level in the tank, means for producing a flow of liquid upwardly through the tube and into the conduit, and a feed inlet pipe connected with the conduit below the liquid level in the tank.

14. An agitator or aerator comprising a tank open to the atmosphere, a conduit in the tank, a rotary impeller below the conduit, a downwardly-ranging tube in the tank having an inlet opening at its lower end and connecting with the conduit at its upper end, and a diffusing means in the conduit in the path of material drawn through the conduit and in the path of material drawn through the connection.

15. An agitator or conditioner comprising a tank, overflow means for said tank adjustable to vary the level of fluid material and froth in said tank, a conduit in said tank having an open upper end, a vertically movable member cooperating with said open upper end to regulate the height of said open upper end to maintain said open upper end at a suitable froth gathering level.

16. An agitator or conditioner comprising a tank, overflow means for said tank adjustable to vary the level of fluid material and froth in said tank, the conduit in said tank having an open upper end, the upper end of said conduit comprising a vertically sliding collar to regulate the height of said open upper end in accordance with the said varying froth level, and means to circulate the froth downwardly through the conduit.

17. An agitator or conditioner comprising a tank, overflow means for said tank adjustable to vary the level of fluid material and froth in said tank, a conduit in said tank having an open upper end, the upper end of said conduit comprising a vertically sliding collar to regulate the height of said open upper end above the bottom of the tank to maintain said open upper end at a suitable froth-gathering level, means to circulate the froth downwardly through the conduit, and means for admitting air under pressure to the material discharged from the conduit.

HARRY V. WALLACE.
LELAND H. LOGUE.